United States Patent [19]

Cassorla et al.

[11] Patent Number: 5,146,552
[45] Date of Patent: Sep. 8, 1992

[54] METHOD FOR ASSOCIATING ANNOTATION WITH ELECTRONICALLY PUBLISHED MATERIAL

[75] Inventors: Elie Cassorla, Croton-on-Hudson, N.Y.; Jacqueline P. de Vries, Mahwah, N.J.; Michael E. Moran, Spring Valley, N.Y.; James J. Slater, Boulder, Colo.; Jay Unger, Mohegan Lake, N.Y.

[73] Assignee: International Business Machines Corporation, Armonk, N.Y.

[21] Appl. No.: 486,461

[22] Filed: Feb. 28, 1990

[51] Int. Cl.$^5$ .............................. G06F 15/00
[52] U.S. Cl. ..................................... 395/145
[58] Field of Search ................. 395/144–146, 395/148

[56] References Cited

U.S. PATENT DOCUMENTS

| | | | |
|---|---|---|---|
| 4,575,813 | 3/1986 | Bartlett et al. | 364/900 |
| 4,608,664 | 8/1986 | Bartlett et al. | 364/900 |
| 4,648,067 | 3/1987 | Repass et al. | 395/144 X |
| 4,716,404 | 12/1987 | Tabata et al. | 395/134 X |
| 4,748,678 | 5/1988 | Takeda et al. | 395/145 X |
| 4,984,162 | 1/1991 | Torii et al. | 395/145 X |

OTHER PUBLICATIONS

Elie Cassorla & Jim Slater, "Onscreen Possibilities . . . Today!", *1986 Intl. Professional Communication Conference, (IEEE)*, Oct. 22–24, 1986.

*Primary Examiner*—Gary V. Harkcom
*Assistant Examiner*—Michael A. Jaffe
*Attorney, Agent, or Firm*—John E. Hoel

[57] ABSTRACT

The operating principle permits a reader of an electronically published document to create notes, bookmarks, or annotations and relate them to a particular location in the document. The record of such annotations or "place marks" can be stored within or separately from the published material. Annotations stored separately from the originally published document are associated by name with the document and can either be accessed by a particular individual reader and/or shared and exchanged between individuals with access to the same (or copies of the) published electronic document for a variety of purposes. The attachment of annotations is a capability provided to the reader of an electronic document and does not require any specific preparation on the part of the writer or editor of an electronic document. The association of annotations with a particular context within the document exploits the fact that the writer in constructing an electronically published document has indicated the structure of the document by "marking up" the material and identifying major document elements such as chapters, sections, sub-sections, paragraphs, figures, etc. It also uses relative position within the "finest" identified document element to fix the precise position of some annotations that the reader wants to pinpoint to a particular line or word position.

29 Claims, 5 Drawing Sheets

FIG. 2

FORMATTED TEXT STREAM 25

COORDINATES 56

| | h1 | h2 | h3 | p/w |
|---|---|---|---|---|
| [h1] CHAPTER HEADING [/h1] | 1 | 0 | 0 | 0 |
| [p] PARAGRAPH OF TEXT [/p]  — 40' | 1 | 0 | 0 | 1 |
| [p] PARAGRAPH OF TEXT [/p] | 1 | 0 | 0 | 2 |
| [h2] FIRST TOPIC HEADING [/h2] | 1 | 1 | 0 | 0 |
| [p] PARAGRAPH OF TEXT [/p] | 1 | 1 | 0 | 1 |
| [p] PARAGRAPH OF TEXT [/p]  — 42' | 1 | 1 | 0 | 2 |
| [h2] SECOND TOPIC HEADING [/h2] | 1 | 2 | 0 | 0 |
| [p] PARAGRAPH OF TEXT [/p] | 1 | 2 | 0 | 1 |
| [h3] FIRST SUBTOPIC HEADING [/h3] | 1 | 2 | 1 | 0 |
| [p] PARAGRAPH OF TEXT [/p] | 1 | 2 | 1 | 1 |
| [p] PARAGRAPH OF TEXT [/p]  — 43' | 1 | 2 | 1 | 2 |
| [h2] THIRD TOPIC HEADING [/h2] | 1 | 3 | 0 | 0 |
| [p] PARAGRAPH OF TEXT [/p] | 1 | 3 | 0 | 1 |

MEMORY 22

FIG. 3

COORDINATES 56

| h1 | h2 | h3 | p/w | ITEM | TYPE | USER | STRING (ANNOTATION STRINGS 24') | |
|---|---|---|---|---|---|---|---|---|
| 1 | 0 | 0 | 1 | 1 | 1 | 1 | "SPELLING?" | 28' |
| 1 | 0 | 0 | 1 | 2 | 1 | 2 | "ITS OK" | 30' |
| 1 | 1 | 0 | 2 | 1 | 1 | 1 | "CHECK THIS" | 32' |
| 1 | 1 | 0 | 2 | 2 | 1 | 2 | "OOPS! ITS 25." | 34' |
| 1 | 2 | 1 | 2 | 1 | 1 | 1 | "GRAMMAR?" | 36' |
| 1 | 2 | 1 | 2 | 2 | 1 | 2 | "ITS DIALECT!" | 38' |

ANNOTATION STRING RECORDS 24

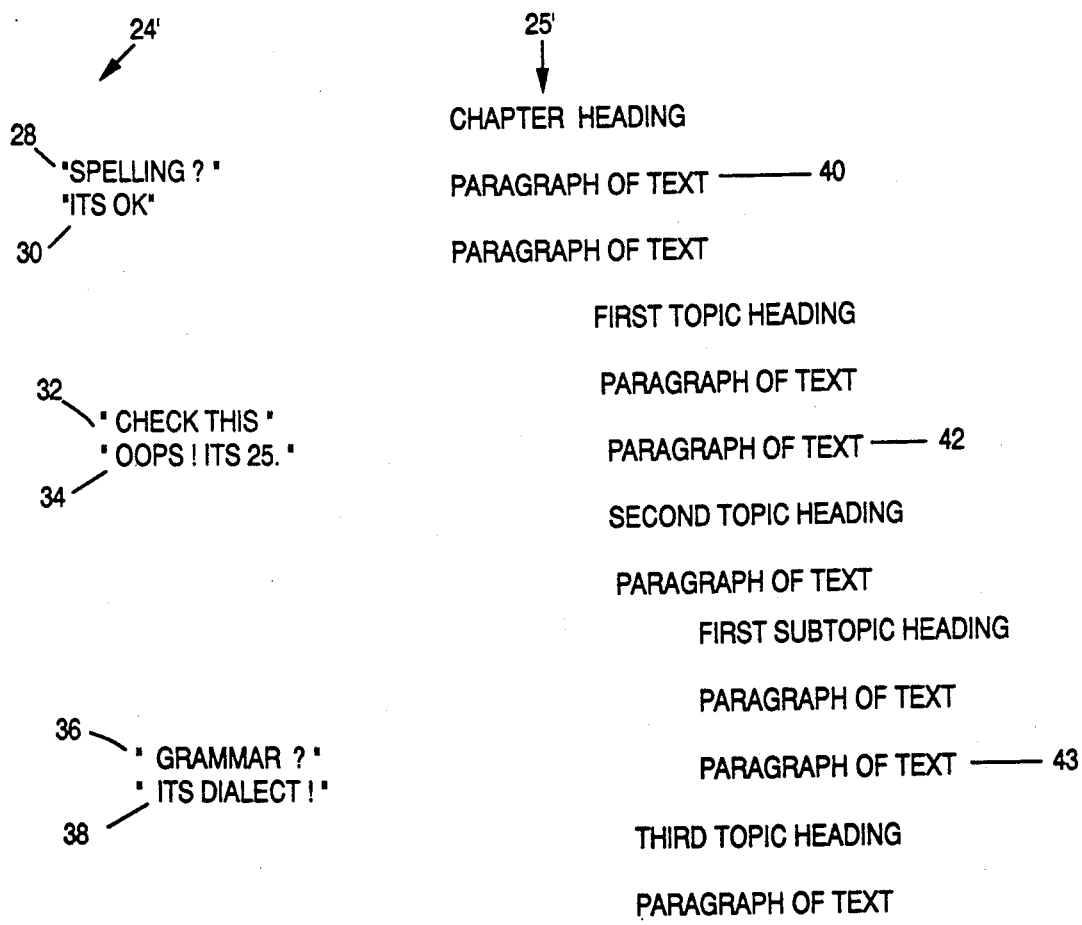

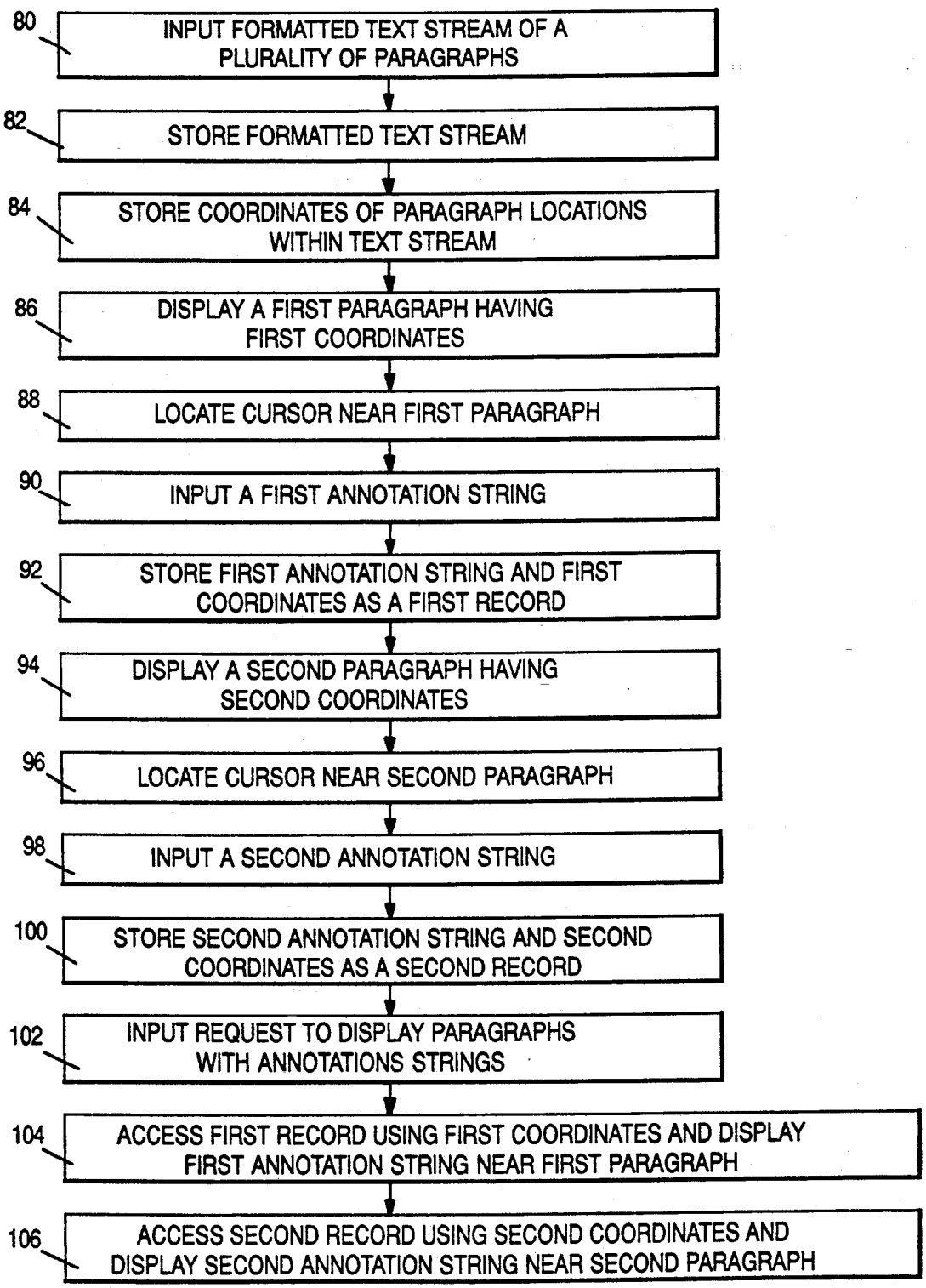

METHOD FOR ASSOCIATING ANNOTATION WITH ELECTRONICALLY PUBLISHED MATERIAL

BACKGROUND OF THE INVENTION

1. Technical Field

The invention disclosed broadly relates to data processing methods and more particularly relates to improvements in electronic publishing.

2. Background Art

Modern word processing and text editing programs employ structured document architecture to provide greater control and flexibility in the displayed and printed appearance of documents prepared with the programs. Structured document architecture is described, for example, in the copending U. S. patent application Ser. No. 344,332, filed Apr. 26, 1989, entitled "A Method for Manipulating Elements Within a Structured Document Using Active Intent Interpretation," by C. J. Bennett, et al., assigned to the IBM Corporation and incorporated herein by reference. A structured document can be prepared in accordance with the standardized general markup language, such as is described in the International Standard's Organization Standard 8879-1986. A data stream of text marked up in accordance with the standardized general markup language, will have its text divided into elements consisting of a begin tag and its content and terminated by an end tag, when necessary. Within a WYSIWYG (what you see is what you get) editor, text is displayed to the user as it will appear when it is printed, even though its structure is defined by the begin tags and end tags for each element of text. Formatting of the elements within a structured document is done when the document is displayed to the user. Those elements which fall into the category of commonly used elements include paragraphs, simple lists, ordered lists, bulleted lists, and list items.

Large documents marked up with structured document architecture tags, can be manipulated as an electronic book, by the method described in the copending U.S. patent application Ser. No. 317,248, filed Feb. 20, 1989, now abandoned, entitled "A Method for Displaying On-Line Information," by E. Cassorla, et al., assigned to the IBM Corporation and incorporated herein by reference. The Cassorla, et al. patent application describes a method for creating on-line information from the same marked up source material used to create printed information such as a word processor or a markup language source used with a text formatter. A book data stream is provided, in an intermediate format for storing on-line information, specifically designed to be used by a book display program. The data stream captures and preserves structural information about the books, by using the structured document tags. The method is suited to display on-line books in a useable manner on a variety of display devices. A book display program manipulates the book data stream and allows users to interact with the on-line information. The electronic book may be used like a hard copy book, except that it is displayed on a display screen. The method allows readers to treat on-line books as if they were hard copy books, and uses the book data stream as its input.

When a structured document electronic book is in its draft form, it can be reviewed by several reviewers who may wish to make comments or suggest additions or deletions to the draft.

OBJECTS OF THE INVENTION

It is therefore an object of the invention to provide a means for annotating an on-line electronic book.

It is another object of the invention to provide a means for creating notes, bookmarks or annotations which are related to a particular location in an electronic book.

It is a further object of the invention to provide a means for associating a plurality of annotations for different purposes and/or from different sources, for an electronic book.

SUMMARY OF THE INVENTION

These and other objects, features and advantages are accomplished by the method for associating annotation with electronically published material, disclosed herein. The operating principle permits a reader of an electronically published document to create notes, bookmarks, or annotations and relate them to a particular location in the document. The record of such annotations or "place marks" can be stored within or separately from the published material. Annotations stored separately from the originally published document are associated by name with the document and can either be accessed by a particular individual reader and/or shared and exchanged between individuals with access to the same (or copies of the) published electronic document for a variety of purposes. The attachment of annotations is a capability provided to the reader of an electronic document and does not require any specific preparation on the part of the writer or editor of an electronic document. The association of annotations with a particular context within the document exploits the fact that the writer in constructing an electronically published document has indicated the structure of the document by "marking up" the material and identifying major document elements such as chapters, sections, sub-sections, paragraphs, figures, etc. It also uses relative position within the "finest" identified document element to fix the precise position of some annotations that the reader wants to pinpoint to a particular line or word position.

Annotations whether stored in a separate data structure or stored within the electronic "book" file are recorded separately from the context of the published material and are positioned by the method described. This means that annotations can be quickly located and "reviewed," "displayed," "printed," etc. either separately or in conjunction with the associated document context. Additionally, multiple "strings" of annotations for different purposes and/or from different sources can be maintained.

BRIEF DESCRIPTION OF THE DRAWINGS

These and other objects, features and advantages of the invention will be more fully appreciated with reference to the accompanying Figures.

FIG. 2 is a diagram depicting the memory image of formatted text and paragraph coordinates.

FIG. 3 is a memory image of annotation string records.

FIG. 4 illustrates the display of book text with associated annotations.

FIG. 5 is a flow diagram of the invention.

DESCRIPTION OF THE BEST MODE FOR CARRYING OUT THE INVENTION

Figure 1:
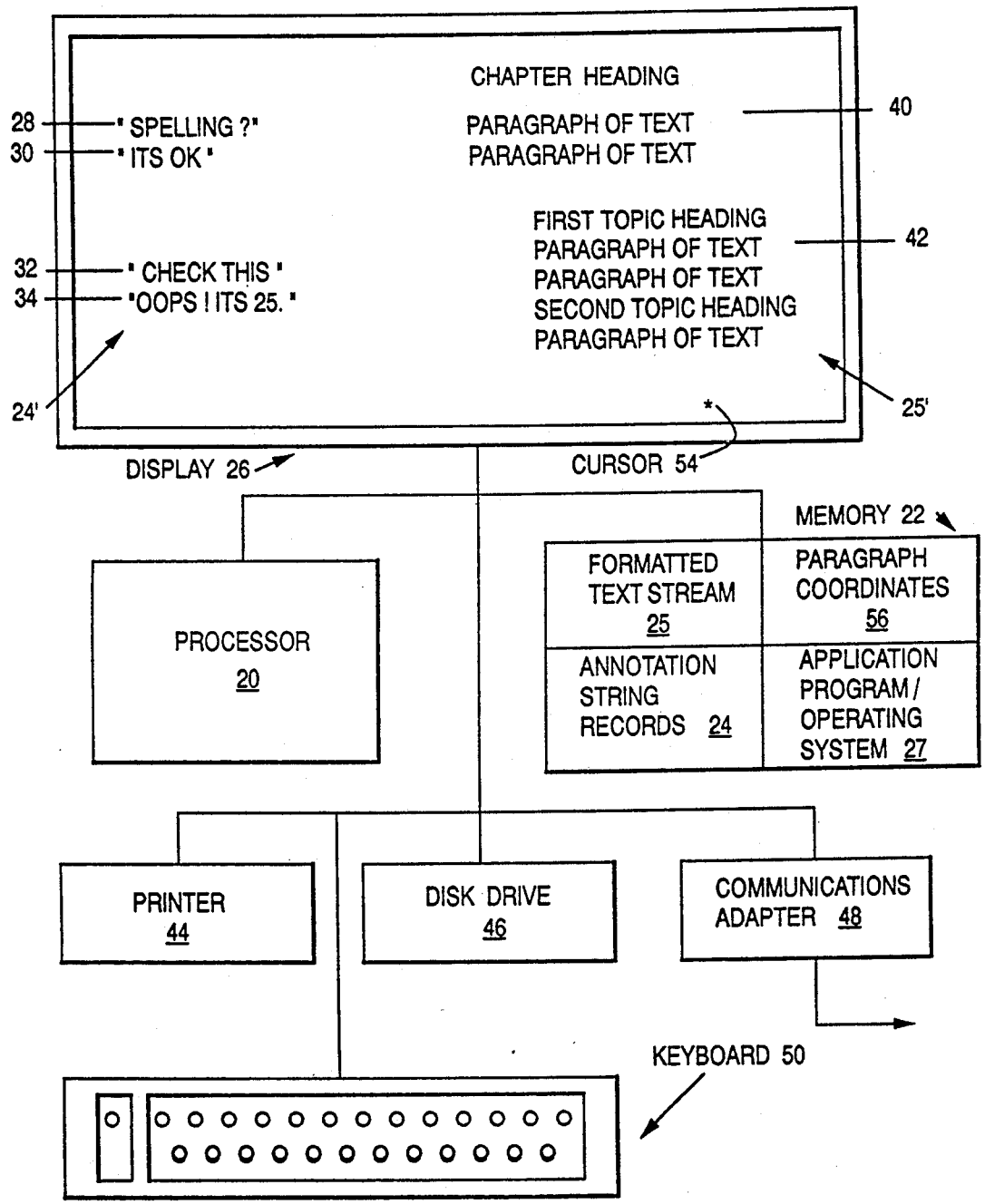
FIG. 1 is an architectural diagram of an electronic book management system, in accordance with the invention.

The invention disclosed herein will be described within the context of the electronic managing program described in the E. Cassorla, et al. patent application referenced above.

The invention described may be invoked by a reader at any time when using an "electronic" book by an appropriate action with a pointing mechanism such as a text or graphic cursor driven by a mouse, touch screen, joystick, keyboard or other command action. The location within the document indicated by the pointing mechanism is intended by the reader as the context of the annotation. The material to be associated as a annotation can be a simple place mark that can be used later to return to the same document location, a highlighted document area (indicated with color or special typefaces), or a complex written notation that itself constitutes a form of electronic document. When the reader creates the annotations they are given the option of either positioning the association with only the document element describing its location, or requiring that a fine or precise position within the document element such as line or word position also be recorded. An electronic "book" file contains published material that may include text, headings, figures, pictures, etc. organized as a set of document elements. These document elements such as chapters, sections, topics, subtopics, paragraphs are identified by the writer during document production and are recorded as part of the book file. The document elements are usually arranged in a nested fashion, that is paragraphs are contained within subtopics, subtopics within topics and so on. As such, in a typical document, the structural context often locates a particular "spot" in the document fairly accurately. In addition to the writer identified document elements, the text and material within the smallest document element is identified by its relative position within that element. For example a specific position in the document might be identified as in chapter 3, topic 17, subtopic 4, paragraph 3, 46th word. Since in this mechanism, annotations are positioned relative to the "identified structure" of the document they are associated with, they are strongly "bound" to that structure. To insure proper (desired) positioning of annotations, both the electronic "book" file and any separately recorded files have "header" information added to them that can be correlated by appropriate software to discover when the structure of any revision of the document has changed sufficiently to effect the positioning of the annotations. When the header information of an electronic document and separately stored annotations indicate that the annotations can no longer be placed accurately, appropriate software may still explore the "string" of annotations and through either automatic means or communication with the reader the annotations can be re-positioned within the context of the new document. Because annotations made with this mechanism are located via the structural organization of the electronic document it is usually possible to relate such annotations not only to the electronic "book" file being read but also to the "marked up" input that serves as the source material for generating the electronic document. This makes the annotations available approximately in context to an author who is involved in editing or re-writing the material in the source form.

Several types of annotations are possible with this mechanism. Also each of these annotation mechanisms can be used for several distinct purposes. The simplest place mark is a single "unnamed" position identified by the user when he may wish to temporarily stop reading and later return to the same place in the material to continue reading. When the reader later "re-opens" the electronic "book" he is informed that a bookmark is present and optionally the book is "opened" to the bookmark and the bookmark is removed. This type of annotation is positioned either precisely or coarsely depending on location of the pointer when the reader requests that the book be "closed" with a bookmark. These "bookmarks" are typically unique to a particular reader and are seldom if ever shared or exchanged between users. A more general type of place mark is multiple "named" locations that are significant to a reader or group of readers. These may be thought of as simply analogous to "turned down corners," "index tabs," or "paper clipped" locations that have permanent or semi-permanent significance. They may also be thought of as alternate or inserted "topic" locators that are more significant or useable to a particular reader (or group) than those document headings or index entries generated by the authors identification of document structure. Another type of place mark is used to identify significant material in the context of a document. This type of annotation is typically accomplished by underlining, color "highlighting" or margin "flags" in material printed on paper. Such annotations are often used as a research or study aid and/or as a proofreading or editing tool. Sometimes this type of annotation is "private" and only significant to a particular reader. In other cases this kind of place mark can be valuable as information to be shared or exchanged between users. This type of annotation typically requires two precise points be identified to "bracket" the context to be highlighted and a particular style (color, type style, etc.) be recorded.

Additionally margin "flags" and underlining specifically are often used (especially in volatile technical material) to indicate what information in a new document has been substantially changed or revised from a previously published version. While such change indicators are usually handled by the same mechanics that are employed to record reader annotations they are typically included in the electronic "book" file with a newly published version of a document. Also, change indicators can be generated automatically by comparison of the versions of a document or identified manually by the author.

A very flexible form of annotations supported by this technique are "notes." Notes are text created by a reader and associated with a specific context of the published material. Typically notes may be created, edited, reviewed, or printed by readers at their convenience while they are reading an electronic book. Notes can be used for many purposes. Most narrowly, notes are frequently used by readers to augment the information presented in the base document for their own reference. Notes can also be used as a synopsis or summary of document element content. Notes may also be used to relate specific application of the information in the publications to real situations or examples. Such notes are commonly specific to a reader or group of readers with common objectives, applications or tasks. Notes can also be used very broadly as a mechanism of communication in the context of a particular document. Such notes, embodying comments, editorial remarks, and discussion of document content are frequently created by readers solely for the purpose of exchange with either document authors and/or other readers.

During the operation of the "read" facility of the invention, if the user wishes to make a margin note pertaining to a particular line in a particular topic of the document, the user can invoke the "note" function. The "note" function identifies the topic and the line number by the position of the text cursor within the document. A separate window is then displayed within which the user may create a note consisting of text of arbitrary length. The "note" window provides rudimentary text editing capability including addition and deletion of text, scrolling, etc. Once the reader has completed a note, the invention adds the topic, line number, author identification, date and time information to the text of the note. The note is then stored in a file or partition of a file on on a host-based system, or as a separate file on the local disk of a stand-alone workstation or personal computer. Notes pertaining to a specific book are organized into ordered "strings" relative to the document content. This is so that later when the user wishes to review notes associated with a particular book for a specific purpose or by a particular reader, the program can present consecutive notes in the order appropriate to the document structure.

An additional feature can be used when several reviewers of a book-in-progress are working on the on-line text. Each respective reviewer can reference his notes to the topic and the line location in the book file. Later, the user can review these notes and can look at all of the notes entered by a particular reviewer. The user can merge the notes by several reviewers pertaining to a particular topic. An additional function is when the user enters the review mode, the "read" program will automatically identify which lines in the book file have notes which pertain to that line. An additional feature is the provision of a control header for the book file itself. For books that are revisions or new editions of previously provided books, the control header will include (among other information), the location of revisions along with revision designation symbols. Then, when the "read" program displays a book file document, if there are revisions which have been identified by the revision location information in the control header, they will be demarcated by a marginal indicium. The "read" function described herein can be applied to both a host-based system as well as to a stand-alone, personal computer running the "read" program.

An example electronic book management system which carries out the invention, is shown in FIG. 1. The system shown in FIG. 1 is an example workstation which can be connected over communications adapter 48 to a data communications network and a host computer. The workstation in FIG. 1 includes a processor 20 connected to a memory 22. The memory 22 has stored therein an application program and operating system 27, the formatted text stream 25, the paragraph coordinates 56 for the formatted text stream 25, and annotation string records 24 which have been selectively associated with portions of the formatted text stream 25.

The workstation of FIG. 1 further includes a display 26 connected to the processor 20, which shows the WYSIWIG displayed image 25' of the formatted text stream 25, along with the displayed image 24' of the annotation string records 24.

The workstation of FIG. 1 further includes a printer 44, disk drive 46 and communications adapter 48, all connected to the processor 20. In addition, a keyboard 50 connected to the processor 20, enables the workstation user to operate the electronic book management system.

FIG. 2 is a more detailed diagram of the memory image for the formatted text stream 25, showing in particular the paragraph coordinates 56 associated with each particular paragraph and heading in the formatted text stream 25. The formatted text stream 25 illustrated in FIG. 2 has structured document tags similar to those referenced above. The structured document tags for the chapter heading is begin tag [h1] and ending tag [/h1]. Under the chapter heading, there are two paragraphs, each denoted by paragraph begin tag [p] and end tag [/p]. The formatted text stream 25 is characterized by a hierarchical organization, in that the first topic heading depicted by its begin tag [h2] and end tag [/h2], is subsidiary to the chapter heading in the hierarchy. Similarly, the second topic heading denoted by its begin tag [h2] and end tag [/h2], has an equal level in the hierarchy with the first topic heading, but is also subsidiary to the chapter heading. Still further, the first subtopic heading denoted by its begin tag [h3] and end tag [/h3], is subsidiary to the second topic heading. Use is made of this hierarchical structure for the formatted text stream 25, to establish a coordinate system 56. The coordinate system is shown in FIG. 2 with four digits representing the hierarchical level of the particular heading or paragraph entry to which the coordinate is associated. For example, the paragraph of 42' has a coordinate of h1=1, h2=1, h3=0 and p=2. This means that the paragraph 42' is part of the first h1 chapter heading, part of the first h2 topic heading, and is not part of any subsidiary topic heading to the first topic heading. The p=2 coordinate represents that paragraph 42' is the second paragraph under the first topic heading.

Once the structure of the formatted text stream 25 is established with an overall organization for headings and ordered paragraphs, annotations can be associated with a particular paragraph, in accordance with the invention, and changes can be made to the text of all paragraphs and headings without changing the validity of the relationship between the annotation and the associated paragraph. This can be better seen with reference to FIG. 3.

FIG. 3 is a memory image of annotation string records 24 which have been entered by two different users who are reviewing a draft of the formatted text stream 25. The annotation string records 24 each have several parts. For example, the annotation string 28' contains the coordinates 56 corresponding to the paragraph 40' or heading which is being annotated in the formatted text stream 25. An annotation string record such as string 28', also includes an item count for the number of annotations associated with a particular paragraph. The annotation string record 28' also includes a type indicator to distinguish text annotations from bookmarks, highlighting or other types of annotation discussed herein. The annotation string record 28' also includes a user field to indicate which user has entered a particular annotation. In addition, the actual character string 28 for the annotation is included in the annotation string record 28'. Reference to FIG. 3 will show how each annotation string 28, 32 and 36 typed in by user 1 will be assembled into an annotation string record 28', 32' and 36'. The string 28 was associated by user 1 with paragraph 40. Referring to FIG. 2, the test of paragraph 40 is contained in tagged as paragraph 40', and has coordinates "1001." Referring to FIG. 3, the annotation string 28' will include the coordinate "1001". The annotation string 28' will also include the item number, in this case "1", the type, in this case "1" meaning it is a text annotation, and a user ID, in this case "1, " referring to user number 1. Similarly, the annotation string records 32 ' and 36' are also assembled as shown. These three annotation records will be sent either as a part of the message containing the formatted text stream 25 or as a separate message associated with the message for formatted test stream 25, to user 2.

In this example there are two users, designated 1 and 2. The first user "1" is assumed to be an editor of the text and the second user named "2" is to be the original author of the text. User 1 will have a copy of the formatted text stream 25 in his workstation and will control the position of the cursor 54 to be adjacent to the paragraph of text 40 and will enter by means of his keyboard 50 the annotation 28 "spelling ?", questioning the spelling of an item in the paragraph. The user 1 will then position his cursor 54 next to paragraph 42 and will enter on his keyboard 50 the annotation string 32 "check this". The user 1 will then position his cursor 54 adjacent to the paragraph 43 and will enter the annotation string 36 "grammar?". After the user 1 has completed editing or commenting on the text string 25, user 1 will command his workstation to transmit the formatted text stream 26 and the annotation string records 28', 32' and 36' over his communications adapter 48 and the connecting network to the workstation of user 2.

At user 2's workstation, the formatted text stream 25 is stored in the memory 22 and the annotation string records 28', 32' and 36' are also stored in partition 24 of the memory 22. User 2 then commands the workstation to display the formatted text stream and also to display any associated annotations. In accordance with the invention, the formatted text stream 25 is displayed on the display 26 and the annotation string records 24 in memory 22 are reviewed to determine whether any of the annotation string records 24 include a coordinate field 56 which is equal to the coordinate of one of the paragraphs of the formatted text stream 25. In accordance with the invention, the annotation string records 28', 32' and 36' are identified as corresponding with the paragraphs 40, 42 and 43, respectively, of the formatted text stream 25. Therefore, the strings 28, 32 and 36 are displayed in a position proximate to their associated paragraphs 40, 42 and 43, respectively.

User 2 can now review the formatted text stream image 25' and the annotation images 24' and can, selectively, add annotations to any of the paragraphs. Since user 2 will be responding to the annotations entered by user 1, user 2 positions his cursor 54 adjacent to paragraph 40 and from his keyboard 50 enters the annotation string 30 "It's OK". User 2 then positions his cursor 54 adjacent to the paragraph 42 and from his keyboard 50 enters the annotation string 34 "Oops! It's 25." User 2 can then place his cursor proximate to paragraph 43 and enter his annotation 38.

In a manner similar to that described above, the annotation string records 30', 34' and 38' are assembled for the annotation strings 30, 34 and 38, respectively, by taking the corresponding paragraph coordinates for the associated paragraphs 40, 42 and 43, respectively, and assembling those coordinates along with the item number, type and user ID. For example, the annotation string record 30' is assembled with its annotation string "It's OK", the coordinate "1001" corresponding to paragraph 40, the item number "2" which indicates that this is a second annotation item attributed to the paragraph 40, the type number "1," which indicates that this is annotation text, and the user ID "2" which indicates that user 2 is making this entry.

The annotation string records 30', 34' and 38' are stored in the memory partition for annotation strings 24, in memory 22. Later, user 2 can display the formatted text stream 25 and selectively also display either his own annotations by selecting only "user 2" generated annotation string records, or alternately he can look at only type "1" annotations, or alternately, he can select not to view any annotations with the formatted text stream image 25'.

It can be seen that alternate types of annotation can be specified in the type field of the annotation string record 24, for example to place a bookmark, without any text string. Alternately, underlining, color highlighting, or margin flags can be specified by different type entries in the type field of the annotation string record 24.

The invention is capable of associating annotation strings with individual words within a paragraph by providing the coordinates "h1," "h2," "h3" and "p" as described above and, as shown in FIG. 2, further including a "/w" which indicates the number of words from the beginning of the paragraph for the location of the target word. The location of the target word is then associated with the annotation string, as has been described above for association with paragraphs. The word count offset value "/w" is also included in the specification of the coordinates included in the annotation string record of FIG. 3.

FIG. 5 illustrates a flow diagram of a sequence of operational steps to carry out the invention. The sequence of operational steps shown in FIG. 5 can be embodied in the application program 27 located in the memory 22 of FIG. 1. In FIG. 5, the flow diagram begins with step 80, inputting a formatted text stream of a plurality of paragraphs, such as the formatted text stream 25. Then, the process flows to step 82 where the formatted text stream 25 is stored in the memory partition of memory 22. The process then flows to step 84 where the coordinates of the location of each paragraph within the text stream is stored in partition 56 of memory 22. These coordinates, in the preferred embodiment of the invention, are the hierarchical coordinates "h1," "h2," "h3," and any lower hierarchical levels, plus the paragraph count "p," and optionally the word offset "/w."

The flow diagram of FIG. 5 then transfers to step 86 where the user can command from keyboard 50, the display on display 26 of any of the paragraphs or multiple paragraphs from the formatted text stream 25, such as the paragraphs in the image 25' of the formatted text stream 25, shown in FIG. 1. The process then flows to step 88 where the user may locate the cursor 54 near a selected paragraph, such as near paragraph 40. The flow diagram then transitions to step 90 where the user may input a first annotation string 28 at the keyboard 50. The flow diagram then transitions to step 92 where the first annotation string 28 and the corresponding coordinates "1001" for the paragraph 40 are assembled into a first annotation string record 28' shown in FIG. 3, and this annotation string record is then stored in the memory partition 24 of memory 22.

Optionally, the user may elect to immediately display the annotation string 28 near the paragraph 40, or alternately the user may continue annotating the formatted text stream 25. If the user elects to continue, then the flow diagram of FIG. 5 transitions to step 94, where the user displays a second paragraph, such as paragraph 42 of FIG. 1, having a second set of coordinates "1102," the paragraph being displayed on the display 26. The process of FIG. 5 then transitions to step 96 where the user then locates the cursor 54 near the second paragraph 42. The flow diagram then transitions to step 98, where the user inputs at keyboard 50, a second annotation string 32. The process then transitions to step 100 where the second annotation string 32 is assembled with the second set of coordinates "1102" corresponding to paragraph 42, into a second annotation string record 32'. The second annotation string record 32' is then stored in the annotation string record partition 24 of memory 22.

Either immediately, or at a later time, the user can input a request to display paragraphs from the formatted text stream 25 and their associated annotation strings, as provided in step 102 of FIG. 5. The process then transfers to step 104 of FIG. 5 where a first paragraph 40 is selected to be displayed, and in accordance with the invention, the first annotation string record 28' is accessed from the annotation string record partition 24 of the memory 22, by searching for the coordinates "1001" of the paragraph 40, which are included in the annotation string record 28'. The character string 28 "spelling ?" is then extracted from the annotation string record 28' and is displayed at a position near to the location for display of paragraph 40 on the display 26, as is shown in FIG. 1. The process can terminate at this point or alternately, the user can elect to display the second paragraph and its associated annotation string, as provided in step 106 of FIG. 5. In accordance with the invention, the second paragraph 42 is extracted from the tagged paragraph of text 42' in the formatted text stream 25 stored in the memory 22 of FIG. 2, and the coordinates 56 corresponding to the tagged paragraph of text 42' in memory 22 of FIG. 2, are identified as "1102." This coordinate value is then used to search through the plurality of annotation string records 24 in the memory 22, to locate the annotation string record 32' of FIG. 3. Annotation string record 32' then has its annotation character string 32 which is "check this" extracted and displayed on the display 26 in a position near the location for the display of the paragraph 42, as is shown in FIG. 1.

The user may then continue to add additional annotations to the paragraphs 40 or 42 or to add annotations to other paragraphs 43 in the formatted text stream 25. Any annotations, 28, for example, can be edited by the user or deleted by the user. An annotation string can also be a null character, so that the annotation can serve as a bookmark, for example. If the annotation served as a bookmark, then its type field would be changed to designate that function in the annotation string record of FIG. 3. Further, the user may elect to print the formatted text stream 25 and have the annotations 24' appear near their respective paragraph images 25'. This composite representation can be output on printer 44, by taking the composite image appearing on display 26 and performing a transfer of the contents of the display buffer associated with display 26, to the printer 44. This technique can also be used to transmit the composite image of annotation strings 24' and paragraphs 25' on the display 26 of FIG. 1, to the communications adapter 48 for transmission to other workstations or to a host computer connected thereto. Alternately, the formatted text stream 25 can be assembled as a first message and the annotation string records 24 can be assembled as a second message which can be transmitted either as a contiguous pair of messages or as separate messages over the communications adapter 48 to other data processing units connected thereto.

Thus it is seen that annotation strings can be associated with designated paragraphs in a formatted text stream in a flexible manner, allowing further editing of the contents of various paragraphs and sections in the formatted text stream, without losing the desired association between particular annotation strings and their corresponding paragraphs of text.

Figure 6:
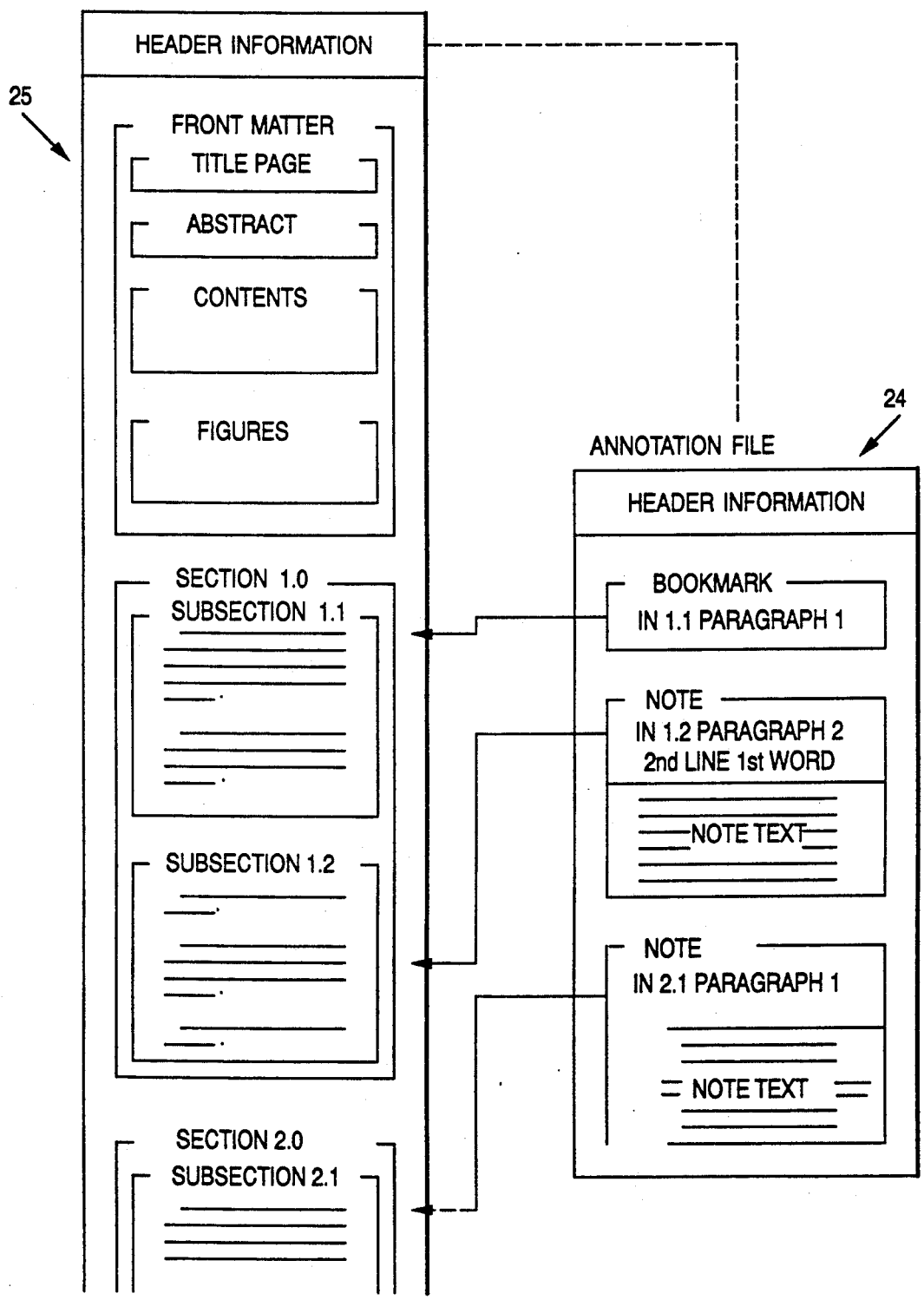
FIG. 6 shows an example memory organization for the formatted text stream 25, and the annotation string records 24 in the memory 22.

FIG. 6 shows an example memory organization for the formatted text stream 25, and the annotation string records 24 in the memory 22.

Although a specific embodiment of the invention has been disclosed, it will be understood by those having skill in the art that changes can be made to the specific embodiment without departing from the spirit and the scope of the invention.

What is claimed is:

1. A method for creating an annotation associated with a designated portion of an on-line book, comprising the steps:
   storing a formatted text stream representing an on-line book in a first memory partition;
   storing coordinates of the locations of a plurality of portions of said formatted text stream;
   said coordinates of portion locations within said text stream being based upon a hierarchical organization of said portions within said formatted text stream, characterized by at least a first and a second hierarchical variable, said first hierarchical variable identifying a number of headings at a first hierarchical level from a beginning point of said formatted text stream to a particular portion and said second hierarchical variable indicating a number of subsidiary headings from a point designated by said first hierarchical variable to said particular portion;
   displaying a designated portion of said formatted text stream;
   entering an annotation and storing it in a second memory partition, associated with coordinates for said designated portion of said formatted text stream;
   selectively accessing said designated portion of said formatted text stream and identifying said coordinates thereof, and in response thereto selectively accessing said annotation and displaying it proximate to a display location for said designated portion of said formatted text stream.

2. The method claim 1, wherein said annotation is a character string.

3. The method claim 1, wherein said annotation is a place marker.

4. The method claim 1, wherein said annotation is a display attribute.

5. The method claim 1, wherein said annotation is a marginal mark.

6. The method claim 1, wherein said annotation is an underline mark.

7. A method for creating annotation associated with a designated portion of an on-line book, comprising the steps of:
- storing a formatted text stream representing an on-line book in a first memory partition in a first processor;
- storing coordinates of the locations of a plurality of portions of said formatted text stream;
- said coordinates of portion locations within said text stream being based upon a hierarchical organization of said portions within said formatted text stream, characterized by at least a first and a second hierarchical variable, said first hierarchical variable identifying a number of headings at a first hierarchical level from a beginning point of said formatted text stream to a particular portion and said second hierarchical variable indicating a number of subsidiary headings from a point designated by said first hierarchical variable to said particular portion;
- displaying a designated portion of said formatted text stream in said first processor;
- entering a first annotation string and storing it in a second memory partition, associated with coordinates for said designated portion of said formatted text stream, in said first processor;
- transmitting said formatted text stream and said first annotation string from said first processor, to a second processor and storing said formatted text stream in a first memory partition and said first annotation string in a second memory partition in said second processor;
- displaying said designated portion of said formatted text stream and said first annotation string in said second processor;
- entering a second annotation string and storing it at said second memory partition in said second processor, associated with said coordinates for said designated portion of said formatted text stream;
- selectively accessing said first and said second annotation strings and displaying them proximate to said designated portion of said formatted text stream, in said second processor.

8. The method of claim 7 wherein said annotation is a character string.

9. The method of claim 7 wherein said annotation is a place marker.

10. The method of claim 7 wherein said annotation is a display attribute.

11. The method of claim 7 wherein said annotation is a marginal mark.

12. The method of claim 7 wherein said annotation is an underline mark.

13. A method for creating annotation text associated with designated portions of an on-line book, comprising the steps of:
- inputting a formatted text stream representing a plurality of paragraphs, into a first memory partition of a data processor;
- storing coordinates of the locations of paragraphs within said formatted text stream;
- displaying a first paragraph of said formatted text stream, having first said coordinates;
- locating a cursor near a displayed location of said first paragraph;
- inputting a first annotation string;
- storing said first annotation string and said first coordinates as a first annotation string record in a second memory partition in said data processor;
- inputting a request to display said first paragraph with said first annotation string;
- accessing said first annotation string record using said first said coordinates and displaying said first annotation string near a location for display of said first paragraph;
- said coordinates of paragraph locations within said text stream being based upon a hierarchical organization of said paragraphs within said formatted text stream;
- wherein said coordinates further comprise:
- at least a first and a second hierarchical variable, said first hierarchical variable identifying the number of headings at a first hierarchical level from a beginning point of said formatted text stream and said second hierarchical variable indicating the number of subsidiary headings from a point designated by said first hierarchical variable;
- a paragraph count variable indicating the number of paragraphs from a point designated by said second hierarchical variable.

14. The method of claim 13, wherein said coordinates further comprise:
- a word count displacement variable indicating the number of words from the beginning of the paragraph indicated by said paragraph count variable.

15. The method of claim 13, which further comprises:
- locating said cursor near said first paragraph;
- inputting a second annotation string;
- storing said second annotation string and said first coordinates for said first paragraph, as a second record;
- said first record including an item number indicating a first item and said second record including an item number indicating a second item;
- inputting a request to display said first paragraph with said first and said second annotation strings;
- accessing said first record using said first coordinates and displaying said first annotation string near a location for display of said first paragraph;
- accessing said second record using said first coordinates and displaying said second annotation string near said first annotation string.

16. The method of claim 13, which further comprises:
- said first annotation string record including a first user identification field with a first user ID value;
- locating a cursor near said first paragraph;
- inputting a second annotation string corresponding to a second user identification;
- storing said second annotation string and said first coordinates as a second annotation record, and including therein in a user identification field, a second user ID;
- inputting a request to display said first paragraph with annotation strings by said second user;
- accessing said second record using said first coordinates and using said second user ID value, and displaying said second annotation string near said first paragraph.

17. The method of claim 16, which further comprises:
- said first annotation string record being stored in a first data processor used by a first user;
- said first annotation string record and said formatted text stream being transmitted from said first data processor over a communications link to a second data processor operated by a second user;

said second annotation string record being stored by said second user at said second data processor.

18. The method of claim 17, which further comprises:

said second user at said second data processor inputting a request to display paragraphs with annotation strings input by both said first user and said second user;

accessing said first record using said first coordinates and said first user ID value and accessing said second record using said first coordinates and said second user ID value;

displaying both said first annotation string and said second annotation string near said first paragraph.

19. A method for creating annotation associated with designated portions of an on-line book, comprising the steps of:

inputting a formatted text stream representing a plurality of paragraphs, into a first memory partition of a data processor;

storing coordinates of locations of paragraphs within said formatted text stream;

said coordinates of paragraph locations within said text stream being based upon a hierarchical organization of said paragraphs within said formatted text stream, characterized by at least a first and a second hierarchical variable, said first hierarchical variable identifying a number of headings at a first hierarchical level from a beginning point of said formatted text stream to a particular paragraph and said second hierarchical variable indicating a number of subsidiary headings from a point designated by said first hierarchical variable to said particular paragraph;

displaying a first paragraph of said formatted text stream, having first said coordinates;

locating a cursor near a displayed location of said first paragraph;

inputting a first annotation string;

storing said first annotation string and said first said coordinates as a first annotation string record in a second memory partition in said data processor;

inputting a request to display said first paragraph with said first annotation string;

accessing said first annotation string record using said first and second coordinates and displaying said first annotation string near a location for display of said first paragraph.

20. The method of claim 19, wherein said coordinates further comprise:

a word count displacement variable indicating a number of words from the beginning of said particular paragraph indicated by said paragraph count variable, to a particular word.

21. The method of claim 19 wherein said annotation is a character string.

22. The method of claim 19 wherein said annotation is a place marker.

23. The method of claim 19 wherein said annotation is a display attribute.

24. The method of claim 19 wherein said annotation is a marginal mark.

25. The method of claim 19 wherein said annotation is an underline mark.

26. The method of claim 19, which further comprises:

locating said cursor near said first paragraph;

inputting a second annotation string;

storing said second annotation string in said first said coordinates for said first paragraph, as a second annotation string record in said second memory partition;

said first record further including an item number indicating a first item and said second record including an item number indicating a second item;

inputting a request to display said first paragraph with said first and said second annotation strings;

accessing said first record using said first said coordinates and displaying said second annotation string near said first annotation string.

27. The method of claim 19, which further comprises:

said first annotation string record including a first user identification field with a first user ID value for a first user;

locating a cursor near said first paragraph;

inputting a second annotation string corresponding to a second user identification for a second user;

storing said second annotation string and said first said coordinates as a second annotation record, and including therein in a user identification field, a second user ID;

inputting a request to display said first paragraph with annotation strings by said second user;

accessing said second record using said first said coordinates and using said second user ID value, and displaying said second annotation string near a location for display of said first paragraph.

28. The method of claim 27, which further comprises:

said first annotation string record and said formatted text stream being transmitted from said first data processor over a communications link to a second data processor operated by said second user;

said second annotation string record being stored by said second user at said second data processor.

29. The method of claim 28, which further comprises:

said second user at said second data processor inputting a request to display paragraphs with annotation strings input by both said first user and said second user;

accessing said first record using said first said coordinates and said first user ID value and accessing said second record using said first said coordinates and said second user ID value;

displaying both said first annotation string and said second annotation string near a location for display of said first paragraph.

* * * * *